US008984073B2

(12) United States Patent
Tan (10) Patent No.: US 8,984,073 B2
(45) Date of Patent: Mar. 17, 2015

(54) GEOGRAPHICALLY LIMITED COMMUNICATIONS SYSTEM AND METHOD

(76) Inventor: Arthur P. Tan, Las Vegas, NV (US)

( * ) Notice: Subject to any disclaimer, the term of this patent is extended or adjusted under 35 U.S.C. 154(b) by 106 days.

(21) Appl. No.: 13/271,433

(22) Filed: Oct. 12, 2011

(65) Prior Publication Data

US 2012/0089689 A1 Apr. 12, 2012

Related U.S. Application Data

(60) Provisional application No. 61/392,086, filed on Oct. 12, 2010.

(51) Int. Cl.
| | |
|---|---|
| G06F 15/16 | (2006.01) |
| H04L 12/58 | (2006.01) |
| G06Q 10/10 | (2012.01) |
| G06Q 50/00 | (2012.01) |
| H04W 4/02 | (2009.01) |
| H04W 4/18 | (2009.01) |

(52) U.S. Cl.
CPC ............ *H04L 51/20* (2013.01); *G06Q 10/107* (2013.01); *G06Q 50/01* (2013.01); *H04W 4/021* (2013.01); *H04W 4/185* (2013.01); *H04L 51/32* (2013.01); *H04L 51/38* (2013.01); *H04L 51/24* (2013.01)
USPC ..... 709/206; 709/207; 455/456.1; 455/456.3; 455/414.2

(58) Field of Classification Search
CPC ... H04L 5/0069; H04L 12/5865; H04L 51/20; H04L 29/0848
USPC .......... 709/207, 206; 705/14.25, 14.1, 14.35; 455/456.3, 456.1, 414.2
See application file for complete search history.

(56) References Cited

U.S. PATENT DOCUMENTS

| | | | | |
|---|---|---|---|---|
| 6,421,669 | B1 * | 7/2002 | Gilmour et al. ............... | 707/750 |
| 6,549,768 | B1 * | 4/2003 | Fraccaroli .................. | 455/456.3 |
| 6,618,593 | B1 * | 9/2003 | Drutman et al. ........... | 455/456.3 |
| 7,593,740 | B2 * | 9/2009 | Crowley et al. ............ | 455/456.3 |
| 7,856,360 | B2 * | 12/2010 | Kramer et al. ................. | 705/1.1 |
| 8,150,844 | B2 * | 4/2012 | Redstone et al. ............. | 707/724 |
| 8,200,247 | B1 * | 6/2012 | Starenky et al. ........... | 455/456.3 |
| 8,310,361 | B1 * | 11/2012 | Stout et al. ............... | 340/539.11 |
| 8,405,501 | B2 * | 3/2013 | Stout et al. ............... | 340/539.11 |
| 8,825,759 | B1 * | 9/2014 | Jackson et al. ................ | 709/204 |
| 2002/0065074 | A1 * | 5/2002 | Cohn et al. .................... | 455/422 |
| 2004/0215793 | A1 * | 10/2004 | Ryan et al. ................... | 709/229 |
| 2004/0235493 | A1 * | 11/2004 | Ekerborn .................. | 455/456.1 |
| 2005/0003804 | A1 * | 1/2005 | Huomo et al. .............. | 455/414.1 |

(Continued)

OTHER PUBLICATIONS

Kol; "Here You Are: A member survey on location-based social networking websites"; Jan. 22, 2007.*

(Continued)

*Primary Examiner* — Jimmy H Tran
(74) *Attorney, Agent, or Firm* — Lightbulb IP, LLC (57) ABSTRACT

A geographically limited communications system comprises a server for receiving one or more posts or messages from one or more location-enabled portable devices. The server may store these posts and retrieve them based on location information stored along with the posts. This allows only posts left at a particular location to be viewed by users at that location. In addition, posts may only be left at a user's current location in one or more embodiments. The server may notify a user when another user leaves a post near or at one of the user's previous posts.

9 Claims, 2 Drawing Sheets

(56) References Cited

U.S. PATENT DOCUMENTS

| | | | |
|---|---|---|---|
| 2005/0021750 A1* | 1/2005 | Abrams | 709/225 |
| 2005/0174975 A1* | 8/2005 | Mgrdechian et al. | 370/338 |
| 2005/0177614 A1* | 8/2005 | Bourne | 709/200 |
| 2005/0250516 A1* | 11/2005 | Shim | 455/456.1 |
| 2006/0270419 A1* | 11/2006 | Crowley et al. | 455/456.2 |
| 2008/0306826 A1* | 12/2008 | Kramer et al. | 705/14 |
| 2011/0238476 A1* | 9/2011 | Carr et al. | 705/14.25 |
| 2012/0047129 A1* | 2/2012 | Redstone et al. | 707/723 |
| 2012/0047147 A1* | 2/2012 | Redstone et al. | 707/748 |

OTHER PUBLICATIONS

Lbs Startups to Watch: A slew of location-based services startups are hoping to make serendipity a little more regular, Red Herring Magazine, Oct. 17, 2005.*

* cited by examiner

GEOGRAPHICALLY LIMITED COMMUNICATIONS SYSTEM AND METHOD

CROSS-REFERENCE TO RELATED APPLICATION

This application claims priority to U.S. Provisional Application No. 61/392,086 titled Geographically Limited Communications System and Method, filed Oct. 12, 2010.

BACKGROUND OF THE INVENTION

The invention relates generally to electronic communications, and in particular to a social networking system and method where communication is time agnostic but geographically limited.

Traditional social networking systems are designed for the purpose of serving the widest audience possible. For example, traditional systems strive to provide full or complete access to posts, images, status updates, and other information thereon from anywhere and at anytime. With the advent of mobile devices, traditional systems now strive to provide complete access to their system or network even from mobile devices. One problem with traditional social networking systems is that they are inherently difficult to integrate with the "real" world.

The following discloses a system and method designed to address the shortcomings of traditional systems while providing unique advantages.

SUMMARY OF THE INVENTION

A geographically limited communications system may comprise one or more communication devices configured to receive a plurality of posts comprising text, location information, and a user identifier; and to receive one or more requests comprising a user's current location from one or more portable devices.

One or more storage devices may be used to store the plurality of posts. In addition, one or more processors may be configured to receive the one or more requests and to retrieve one or more of the plurality of posts from the one or more storage devices with location information indicating a location within a vicinity of the user's current location. The one or more communications devices may be configured to transmit the one or more of the plurality of posts retrieved from the one or more storage devices to the one or more portable devices.

The one or more processors may be configured to determine if the one or more of the plurality of posts overlap and to send a notification to one or more users via the one or more communications devices when the one or more of the plurality of posts do overlap. The one or more users may be those identified by the user identifier in the one or more posts that overlap.

The one or more storage devices may be configured to store a category identifier for one or more of the plurality of posts. The one or more communications devices may send a notification to a user when the category identifier is stored for the one or more of the plurality of posts. The user may be one identified by the user identifier in the one or more of the plurality of posts.

The vicinity of the user's location may be defined by the accuracy of a location detector that is part of a portable device belonging to the user. The plurality of posts may also comprise a range defined by the accuracy of a location detector of the one or more portable devices. This allows each post to have an area that may be used to determine if a post overlaps any other post. The area will generally surround the geographic location where the post was made and may have various shapes and sizes.

Alternatively or in addition, the one or more communication devices may be configured to notify one or more users when one or more of the plurality of posts are within one or more predefined geographic areas. Similar to above, the one or more users may be those identified by the user identifier of the one or more of the plurality of posts within the one or more predefined geographic areas.

A geographically limited communications system may also comprise one or more communication devices configured to receive, from one or more portable devices, a plurality of posts comprising text, location information, and a user identifier, the location information identifying a particular geographic location and an area surrounding the particular geographic location.

one or more storage devices may be configured to store the plurality of posts. One or more processors may be configured to determine if one or more of the plurality of posts have overlapping areas and to generate a notification to one or more users indicating that a new overlapping post has been received by the communications system. The notification may be sent to the one or more users via one or more communications devices. The one or more users being those users identified by the user identifier in the one or more of the plurality of posts that overlap.

The one or more communication devices may also or alternatively be configured to receive one or more requests comprising a user's current location. The one or more processors may be configured to retrieve one or more of the plurality of posts that are at the user's current location using the location information of the plurality of posts. The one or more of the plurality of posts that are retrieved may be transmitted to a user at the user's current location via the one or more communication devices.

Various methods of geographically limited communication are disclosed herein. For example, a method of communicating in a geographically limited manner may comprise providing a server configured to receive a plurality of posts comprising location information and a user identifier, where the location information identifies a particular geographic location and an area surrounding the particular geographic location.

The method may also include receiving a user's current location from a portable device of the user, transmitting to the user's portable device only one or more of the plurality of posts that are located at the user's current location to allow the user to only view the one or more of the plurality of posts that are at the user's current location, and determining if one or more of the plurality of posts having overlapping areas.

A notification may be sent to one or more users identified in the one or more of the plurality of posts having overlapping areas. The one or more posts having overlapping areas may be transmitted (or otherwise communicated) to the one or more users to allow the one or more users to view the one or more posts having overlapping areas regardless of a current location of the one or more users. It is noted that the notification to the one or more users may alternatively be sent when one or more of the plurality of posts are within a predefined geographic area. The one or more users being identified by the user identifier in one or more of the plurality of posts located within the predefined geographic area.

The method may also include receiving a category identifier for one or more of the plurality of posts along with a user identifier, and storing the category identifier along with the user identifier to catalog the one or more of the plurality of posts.

Further features, elements, and details of the communications system are disclosed herein.

BRIEF DESCRIPTION OF THE DRAWINGS

The provided figures are not to scale and illustrate exemplary embodiments of the invention.

DETAILED DESCRIPTION

Figure 1:
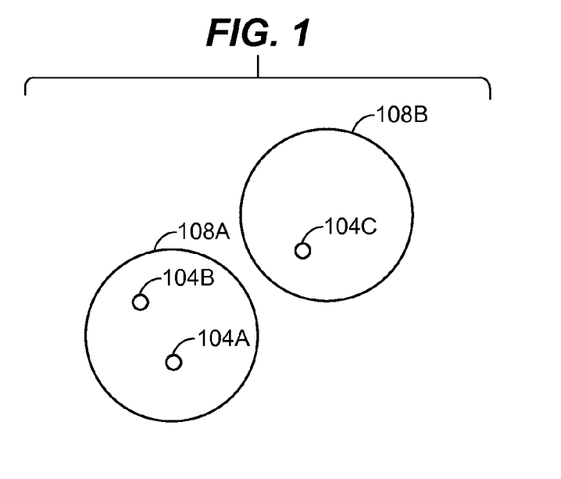
FIG. 1 is a block diagram illustrating the geographic limitation of an exemplary communications system.

In general, the communications system disclosed herein allows its users to leave or post information at one or more geographic locations. Preferably, users may only post information to the geographic location they are at or in. Likewise, users may only view or retrieve information posted in that geographic location. For example, as shown in FIG. 1, User 1 and 2 104A, 104B may only view and leave posts in Geographic Area 1 108A, while User 3 104C may only view and leave posts in Geographic Area 2 108B.

This provides unique advantages. One advantage is that the communications system may be tied to the "real" or physical world. This is because users' may be limited to viewing only the information posted by other users that were or are in the user's current geographic location. In addition, users may be permitted to post information only to the geographic location where the users are currently located. Therefore, the communications system is tied to the physical location of a user.

In this manner, rather than being inundated with information from faraway places, the user may be presented with posted information that is geographically relevant. This is highly advantageous in that it allows a user to not only communicate with those sharing geographic similarity (i.e., those that are or were in the same area), but also to discover new people within the user's geographic area. Stated another way, the communications system allows two or more users to have a conversation (or otherwise communicate) in a geographic location without the users being in the geographic location at the same time.

In one exemplary circumstance for example, a first user may have lunch at a pizza place and post one or more comments, photos, or other data while at the pizza place. An hour later, a second user may be enjoying a pizza at the same pizza place. The second user may access the communications system and be presented with previous posts made within the pizza place. Finding the first user's post interesting, the second user may respond or comment on the first user's post. In one embodiment, the first user may be immediately notified of any responses or comments to his or her posts. The response may be presented to the first user or alternatively, the first user may be required to return to the pizza place before the response may be retrieved. In another alternate embodiment, the first user may not be aware of the response until he or she is at the pizza place again and is able to view the posts/responses made within the pizza place.

The first user may respond to any responses the first user receives. In similar manner to the first user above, the second user may be notified of such a response, presented the response, and/or be required to be within the pizza place to be notified of and/or retrieve the response.

The posts may be a variety of information. For example, a user may write a review of a store or restaurant. A user may comment on events occurring at the time or write the user's thoughts. The posts may contain audio, video, images, and other data. For example, the posts may be turns in a game, such as in a chess or checkers game. The game board may be accessible to any users within the geographic area such that a number of users may play or take turns in the same game. The posts may promote goods or services as well.

Figure 2:
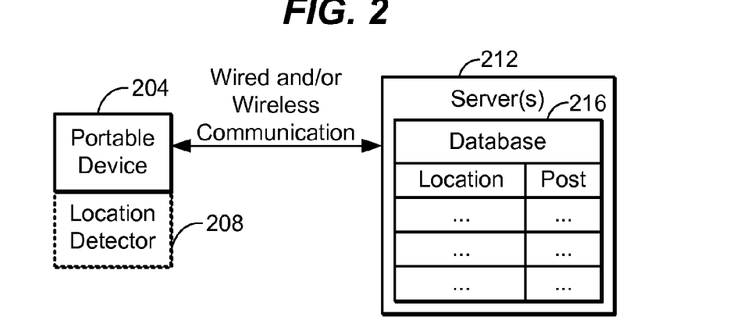
FIG. 2 is a block diagram illustrating and exemplary communications system.

As shown in FIG. 2, posts may be created on a portable device 204, such as a smart phone, tablet, laptop, PDA or the like. The portable device 204 may have a location detector 208 for determining the geographic location of the portable device. For example, a location detector 208 may comprise a GPS device or a cellular receiver capable of triangulating or otherwise determining the location of the portable device 204. The portable device 204 may have a wired or wireless communications device for communicating with one or more servers 212 of the communications system.

A server 212 may access one or more storage devices, such as hard drives, flash storage, optical storage, and the like to retrievably store data. As shown in FIG. 2 for example, the server 212 stores a database 216 containing posts received from one or more portable devices 204. As can be seen, the database 216 may store the location at which a post was made (e.g., GPS, latitude/longitude, or other coordinates) along with the contents of the post. In this manner, the location of the post is retrievably stored on the server 212.

A user may filter posts based on various criteria. In one or more embodiments, this may occur by sending various queries to the database 216. For example, posts from particular types of users may be filtered. To illustrate, a user may only want to view posts from promoters or advertisers such as to find a sale or lunch special within his or her vicinity. The user may also filter posts based on usernames or user identifiers. For example, the user may only view posts from one or more particular users in some embodiments. The user may also filter posts based on time. For example, posts that are beyond a certain age may not be presented to the user. It is contemplated that a user may filter posts based on location for example, the user may reduce the size of the geographic area from which posts are retrieved. Alternatively, the user may expand the size of the geographic area in some embodiments. It is noted that the user may have to pay a fee to expand the size of the geographic area in which he or she may make or retrieve posts.

In one or more embodiments, the user may find other users based on the location of the other user's posts. For example, another user that has made posts in one or more of the same geographic location in which the user has made posts may be presented to the user by the system. In this manner, a user can find other users that share places with the user and potentially become friends with the user. It is contemplated that user's may opt-in or opt-out of this feature.

In another exemplary circumstance, a first user in a waiting room, in line, or otherwise waiting may post a message, start a game, or play a turn of a game. Immediately after or some time after, a second user in the same geographic location may post a response or play a turn of a game in response to the first user's post. A third user in the same geographic location (but at a later time) may then post a response or play another turn of the game and so on and so forth until the game is finished or a new game is started. Any of the users within the geographic location may also post information such as messages, photos, audio, video, games, or other data.

Figure 3:
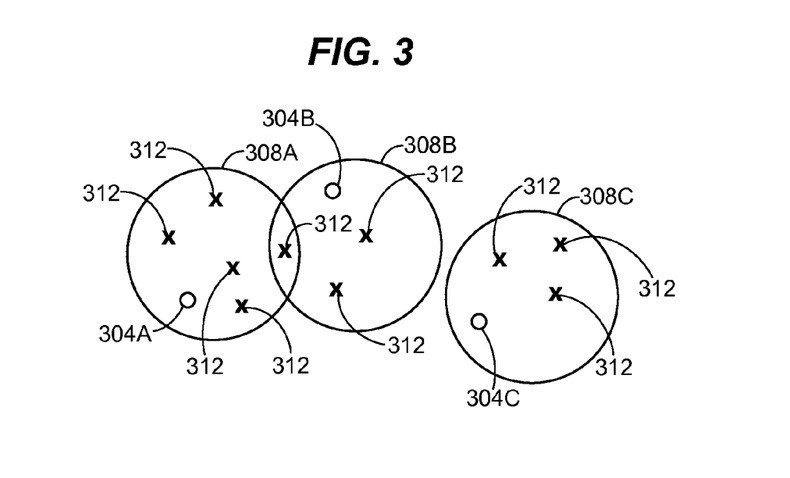
FIG. 3 is a block diagram illustrating the geographic limitation of posting and retrieving of posts of an exemplary embodiment of the communications system.

Referring to FIG. 3 for example, User 1 304A and User 2 304B can respectively see posts 312 in Geographic Area 1 308A and Geographic Area 2 308B. As can be seen these geographic areas 308A,308B are adjacent and overlap. The post 312 in the overlapping area of geographic areas 308A, 308B are visible to both User 1 and 2 304A,304B, but the other posts are not visible to both users. When the users 304A,304B posts however, their post 312 will be associated with the current location of the user that made the post. Thus, in FIG. 3 for example, a post 312 by User 1 304A would be left at the current location of User 1.

In some circumstances a user may be permitted to view posts 312 in a larger area or radius. For example, User 3 304C cannot see any posts 312 in Geographic Area 1 308A or Geographic Area 2 308B as illustrated in FIG. 3. However, the range or area of User 3 304C could be extended beyond Geographic Area 3 308C to allow User 3 to view posts 312 in the other areas for example. Typically though, User 3 304C (or any other user) would only be permitted to make or leave a post 312 at his or her current location.

Figure 4:
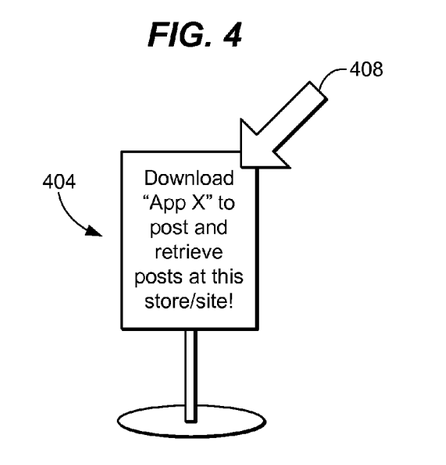
FIG. 4 is a perspective view of an exemplary placard.

In one or more embodiments, a physical placard or other indicator, such as a poster, sign, or the like, may be present at various physical locations to encourage users to interact with the communications system by posting or retrieving information. An exemplary placard 404 is shown in FIG. 4. For example, a placard 404 may identify software used to interact with the communications system and encourage users to download and install the software and post or retrieve information. The placard 404 may be placed in areas where there are potential users, such as pedestrian areas, waiting areas, restaurants, bus stops, shops, lounges, lobbies, offices, and the like. It is contemplated that posting or retrieving information may be an alternate form of entertainment for the users.

The placard 404 may be electronic in one or more embodiments and be configured to display previous posts. For example, as shown by the placard 404 in FIG. 4, one or more lights 408 could be included. In some embodiments, the placard may be configured to collect user input such as to allow users to make posts in addition to or instead of retrieving posts. It is contemplated that existing electronic displays or signage may be used as a placard 404 in one or more embodiments, such as to display one or more posts within the geographic area of the placard.

It is noted that a placard 404 is well suited for the communications system herein since posts may generally only be made and retrieved within a geographic location. Because of this, the placard is not simply promoting another social network, but rather is informing users that others may have posted in this location and that the user may post to this location. For example, in a restaurant, store, line, waiting room, or other area, people may view the placard and be enticed or interested to see what other users may have posted to this geographic location prior to them. The application or software identified by the placard may then be downloaded and installed by the users.

Users may become known for "good" posts. For example, a user may post helpful information such as the best places to sit in a restaurant, food to order, whether or not a particular brand of clothing runs large or small, product reviews, service reviews, whether or not something is a good deal, when is the best time to go to a restaurant or other venue. Such a user may then become known and may receive favorable ratings, such as points. The more points a user has, the more likely others will view his or her posts.

It is contemplated that an owner of a store, restaurant, venue, area, or the like may also post information. For example, a store owner may post recent specials or deals. In one or more embodiments, the owner (or the like) may be given preferred treatment. For example, the owner or other authority of a geographic area may have his or her posts highlighted in some way, such as with unique color(s) relative to other posted information. The owner's post may be larger, cover other posts, or have animated or other eye-catching elements. The owner's post may also or alternatively have audio, video, images, or other features not permitted for "regular" posts. It is contemplated that the owner or another user may pay a fee to distinguish their posts from ordinary posts.

In yet another exemplary circumstance, a first area in an area of high pedestrian traffic, such as a tourist area, may post information recommending sights/attractions, shops, restaurants, that he or she thought were worth visiting. Upon entering the tourist area, a second user may then view such posted information and visit these areas or conduct further research on the first user's recommendations. Ideally, the first user's posted information will pertain to sites within the geographic area, or at least within walking distance from the geographic area. Alternatively, the second user, having visited some of those sites, may disagree with the first user and post information indicating the same. A third user may then retrieve both the first user's post and the second user's response and make a decision based on both user's information.

A geographic location may be any area on Earth where a user may be located and his or her location determined or detected. The geographic location may be an area of various shapes and sizes. For example, in one embodiment, the geographic location may be a circular or other shaped radius around the user's current location. The size of the radius may vary. In one embodiment, the size of the radius may be similar or equal to the potential error in the user's location measurement. For example, where a GPS apparatus or other location detector has a potential error of X feet (or other measure of distance), the geographic location may be defined as a radius approximately or equal to X feet.

A geographic location may also correspond to physical landmarks, borders, and the like. For example, a geographical location may be defined by the perimeter or confines of a building, street, lot, park, stadium, or other structure or predefined area. In this manner, if a user is within a building (or other structure/predefined area), the user's geographic location may be defined as the building rather than, for example, a radius around the user. It is contemplated that a geographic location may also be within a structure/predefined area. For example, the geographic location may be a department or section of a store, an office within a building, a store at a strip mall, etc. . . . . .

The user's location may be pinpointed to varying degrees. In one or more embodiments, the best available or most accurate user location may be used. The user's location may be determined by various devices now known or later developed. For example, the user's location may be determined by GPS or by triangulation of cellular or other signals.

It is contemplated that the geographic locations may be relatively small, such as between 10 and 300 feet around a user's location. This helps filter the number of posts the user may need to sift through. In addition, this keeps the communications system highly localized and tied in to the physical world. The geographic locations may be smaller or larger than the exemplary range specified above. As stated, it is contemplated that users may have to pay a fee to expand (or contract) the "default" geographic area in which they may post information or retrieve information. For example, a promoter may desired to post information at a number of locations. The promoter may either physically locate him or herself to such locations and post information, or it is contemplated that the promoter may pay a fee to be allowed to post such information. Likewise for retrieving information.

In another exemplary circumstance, a first user and a second user may be communicating at one or more geographic locations that they both visit. The users may be or begin to identify one another based on their respective usernames and/or other identifiers. Users may setup alerts or filters which notify the users when a new post of matching one or more particular criteria is in the geographic area. For example, the first and/or second user may have an alert set when new posts by the other user are found within a geographic area. One day, the first user may post information at a geographic location. The second user, also being at the geographic location, may receive an alert of the same. It being apparent that the user's are at the same location at the same time, the users may decide to meet in person for the first time.

It is noted that users may setup a profile. A user profile may include an identifier such as a user name. In addition, the user profile may include information about the user that the user wishes to save and/or share. The user profile may also include one or more photos, videos, and images. A profile may also be generated by the communications system and provided to the user. For example, the communications system may generate an identifier for the user and/or a photo, image, sound, video or other profile data for the user. The user may use the generated profile until the user decides to change it. The generated user profile affords the user a degree of anonymity and also allows the user to begin using the communications system quickly (without having to set up a profile).

In another exemplary circumstance, the communications system may be used to replace traditional fliers. Rather than being immediately identified as a mass mailing, users would know that "fliers" of the communications system were delivered by hand because the communications system generally permits posts to be made only within the geographic location in which the posting user is located. Though users may simply ignore these fliers, one advantage is that the material costs and waste are avoided by distributing the fliers with the communications system rather than on paper or other physical media.

It is contemplated that users may be notified of posts made within particular geographic locations. For example, the user may be notified of a post made at a user's mail box, home, or office. The post may also be provided along with the notification. Alternatively, the user may need to be at these particular locations to be notified of and/or retrieve the post. It is contemplated that users may be provided with authentication information in one or more embodiments. This allows the source of a post to be verified. For example, an encryption or key system may be used to verify the source of posted information. In this manner, important communication or verifiable communication may occur. Users may be required to pay a fee for verifiable communication within the communications system.

Posted information may move in one or more embodiments. For example, information posted on board a plane, at or in a car or other vehicle may move with the vehicle. To illustrate, information posted at a parked car may be associated with the car and/or the location where the car was parked. In this way, a user may post information "on" a car and other users may retrieve the information when at the car, regardless of where the car is.

In one or more embodiments, a portable device carried by a user may keep track of the users movements as the user goes about his or her business. The user may then be provided the option of viewing posted information at geographic locations that the user was at before. For example, a user may retrieve posts along the path he or she takes from point A to point B, even though the user may be at another location when he or she decides to view posted information. Otherwise, the user is typically restricted to viewing posts within the geographic location that the user is currently in.

In another exemplary circumstance, a plurality of users may be at an event, such as an event of future historical significance. Users may post information containing their thoughts, eyewitness accounts, experiences, etc. . . . . This information may also contain video, audio, images, and other data as disclosed above. The posted information may be stored and retrieved by other users that subsequently visit the event site to get a first hand account of the event.

A similar thing may occur at landmarks. For example, a user visiting a memorial, statue, or the like may post personal memories relating to the memorial. Subsequent users visiting the memorial may then retrieve the posted information to get a personal account relating to the memorial. It is contemplated that the owner or authority in charge of the memorial may verify the accuracy and truth in such posts and remove those that are false or unverified. For example, a user having personal experience may first verify his or her identity with the authority and thereafter his or her posts may be endorsed by the memorial (or other site) as having significance. These posts may then be distinguished from other posts, such as by color, size, font, or other characteristic(s).

In addition, to the ability of a site owner or authority to post responses to disagreeable posts or other posts, it is contemplated that the authority may be permitted to remove or request that particular posts be removed. In one embodiment, the communications system may provide a voting system where posts may be automatically removed or deprioritized based on the number of negative votes or points a post receives. The voting system may also apply to the user making such posts. In this manner, negative votes will be associated with the user him or herself thus making it increasingly less likely that future posts by such user will be viewed by others. It is contemplated that a user may be removed from the communications system if a particular threshold of negative votes or points is received.

Figure 5:
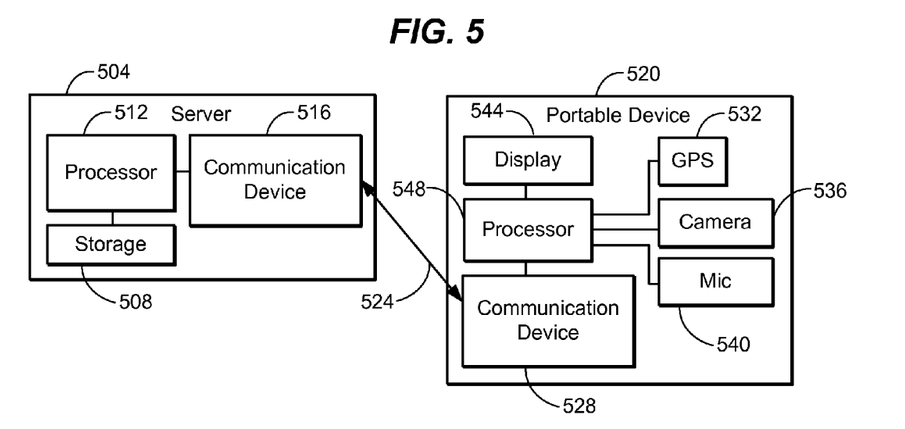
FIG. 5 is a block diagram illustrating an exemplary communications system.

Operation and components of the communications system will now be described. As can be seen in FIG. 5, in one or more embodiments, the communications system may comprise one or more servers 504 configured to receive posted information, store the information, and retrieve the information. The servers 504 may have their own storage devices 508 or be in communication with storage devices to stored/retrieve posted information. In one or more embodiments, the servers 504 may have one or more processors 512 which execute machine readable code or other instructions fixed on a tangible medium to perform the functions described herein. The processors 512 may also or alternatively be hardwired to perform one or more of such functions.

The servers may receive posts via a network or other communications interface 516 or device. As stated above, posts may be received from one or more portable devices 520 via a wired or wireless communications link 524. Such communications link 524 may be established by a communications device 516 of the server 504 and a communications device 528 of a portable device 520. A post may contain or be received along with location information, such as GPS coordinates, identifying the location at which the post was/is made. Alternatively, the server 504 may be configured to determine the location based on other information. For example, the IP address from which a post is received may be used to determine the location at which the post was made. Location information may be generated by a GPS device 532 or the like at the portable device 504.

The servers 504 may store the post associated with the location. For example, as disclosed above, a database or the like may be used to store information containing the post and information containing the location of the post. This information may be associated or linked or stored together so as to allow the post and the location of the post to be associated. Again, the post may comprise text, images, video, audio, and other data. The location may be coordinates, such as GPS or other coordinates. Various other information for identifying a location may be used. It is contemplated that an altitude may also be included in the location information, such as to identify the elevation or floor in which a post was made.

Posts may be stored with additional location information. For example, an address may be stored to help pinpoint the user's location. Alternatively or in addition, the direction a user is facing when the post was made may be stored. Such information may be detected by the user's portable device or may be provided by the user. Posts may also be stored with categorization information to allow the posts to be stored associated with a category and retrieved according to categories. The posts may each belong to one or more categories. Some or all of the categories may be user defined or automatically assigned. For example, a user may categorize his or her posts. Alternatively or in addition, the communications system (e.g., a server) may categorize a post based on for example, the location in which it was made. To illustrate, a post may be categorized type of site/location (e.g., restaurant, store, office, home) where the post was made. Posts may also be stored with a timestamp in some embodiments.

A server 504 may retrieve one or more posts from a storage device 508 based on the location of the requesting user. As discussed above, the location of the requesting user may be provided with a request from a user's portable device 520 or may be determined by the server, such as via the portable device's IP address. In one or more embodiments, only posts having a location within the current geographic location of the requesting user are provided by the server 504 to the requesting user's portable device 520. The posts may be provided in various orders and the user may specify various filters for the posts, such as disclosed above. In one embodiment, the posts may be ordered based on time, the user that posted them, their location (e.g., from closest to farthest away or vice versa), or other characteristic.

One or more predefined geographic locations may be stored by the one or more servers 504. For example, geographic locations corresponding to physical landmarks such as buildings, structures, parks, lots, and other areas may be stored. In one embodiment, when a user is located within one of these areas or sites, the user's geographic location may be a predefined geographic location corresponding to the area. For example, if the user is within a building the user's geographic location may be the perimeter or other area of the building rather than, for example, a radius of X feet around the user. It is contemplated that the Earth may be divided into geographic locations such as squares, rectangles, hexagons, and other shapes in some embodiments.

As stated, a portable device 520 may be used by the users to interact with the communications system, such as via a server 504 of the system. Typically, these portable devices 520 will have a GPS 532, cellular radio, or other location detector configured to determine the users location. The portable device 520 may have one or more processors 548 configured to execute machine readable code stored on a tangible medium to transmit and receive information with the communications system. For example, a software application may be installed on the portable device 520 to interact with the communications system.

The portable device 520 may provide an interface to collect user input such as text that makes up a user's post. For example, a user interface (including a keyboard for example) may be presented to the user on a display 544 or the like to collect user input. The portable device 520 may also include video, image, audio, and other sensors that may be used to record or collect data for a post. For example, a camera 536 and/or microphone 540 may be provided to record visual and/or audio data. Once a post is ready, it may be transmitted to the one or more servers 504 via a communications device 528 of the portable device 520. The portable device 520 may transmit the user's location, such as in the form of GPS or other coordinates, along with the post. Alternatively, the servers 504 may determine the user's location as discussed above.

The portable device 520 may also provide a user interface for retrieving one or more posts. In general, the posts will be those made within the user's current geographical locations. It is noted that the interface may allow the user to setup one or more filters, such as disclosed above, to pare down the number of posts that are presented to the user. The portable device 520 may transmit the user's location to a server as part of or during a request for posts. Though the geographic limitation of the communications system lends itself to portable or handheld device usage, it is contemplated that a desktop or other non-portable computing device may be used as a client in some embodiments. Some exemplary portable devices include smart phones, feature phones, cell phones, GPS devices, portable media players, portable gaming devices, and automobile information centers/systems.

A server 504 may compare the location of incoming posts from one or more portable devices to that of one or more posts already stored by the server. In one or more embodiments, if the location of a new post overlaps or is within a particular distance of a previous post, the server 504 may be configured to notify the user that made the previous post via the user's portable device 520. In this manner, such user is notified of new or recent activity at a location where he or she has left a post before.

The particular distance for such notification may vary. Typically, the distance will be small so that users are only notified when new posts are made close or nearby their previous post(s). For example, the distance may be less than 300 ft in some embodiments. It is noted that the accuracy of the user's detected location may define whether posts overlap (and thus trigger a notification). For example, the accuracy of a GPS location measurement may be stored with a post. The accuracy may be represented in units of distance (e.g., meters or feet). In this manner the posts may have a radius defined by the accuracy of a location measurement or determination. If the area of one post overlaps another, a notification may be sent to one or more of the users that made the overlapping posts. It is contemplated that more than two posts may overlap in some cases and that each unique user may be notified of a new overlapping or nearby post. In one or more embodiments, a user making a new overlapping post may not be notified while the users that made the previous overlapping posts would be notified.

Notifications may be made by transmitting a signal or other data to a portable device 520 belonging to the user that made an overlapping post. Such a device may be identified by a user identifier and a device identifier. For instance, when a user logs in to the communications system via his or her portable device, the server may associate the user and his or her device and store this information in a database. For example, a user identifier may be associated with a device identifier which uniquely identifies the user's device. The device identifier may be transmitted to the server along with the user's username and password and/or other login information. In this manner, the device identifier may be retrieved using the user identifier. The device identifier may then be used by a server to send the device a notification. Since each post saved on a server may identify the user that made it, the device identifier can be found using the user identifier to notify that user's device that a post has been made next to one or more of that user's previous posts.

A server may be configured to retrieve posts within the user's current area or vicinity as disclosed above. The retrieved posts may then be sent by the server to a portable device for presentation, such as via a display 544, to a user. In this manner, the user only sees posts in their current area or vicinity.

In one or more embodiments, the portable device 520 may allow the user to collect or catalog one or more posts, such as by saving such posts on a storage device of a server and/or the portable device. This may occur for instance, by associating a user identifier with an identifier of the post to be cataloged. In this manner, all the posts a user has cataloged may be retrieved using the user's user identifier.

Cataloging posts is advantageous in that it allows users to keep or store posts that they like. This allows posts to be kept as reminders of various events or places. A user may be permitted to catalog posts of others and his or her own posts in some embodiments. A notification may be sent by the server to a user that has had one or more of his or her posts cataloged by another user. This provides feedback to users that have posted. Cataloging also provides another benefit in that cataloged posts may be visible to the user regardless of the user's location, whereas other posts may only be visible to the user if the user is at or near the location at which such posts were made.

A user may categorize the posts he or she catalogs to create an organized list or index of posts. For example, cataloged posts may each be associated with a category name or type when stored. In this manner, a user may quickly find particular cataloged posts. This allows a users to quickly find cataloged posts related to restaurants, stores, animals, and other categories. A user may desire to catalog posts having photos of particular objects or people, etc. . . . . The posts are thus saved in the user's own personal collection/catalog of posts. Since the user may be required to be at the location of a post to view it, the user may only catalog the post when at the location of the post as well. Thus the posts act like physical objects in that they can only be left, viewed, and cataloged when a user is near or at the physical location of the post.

It is contemplated that the portable device may display a map for each post if so desired by the user. This is advantageous in that it allows the user to quickly see where a post was made. For instance, a user may be presented the location of one or more posts in his or her catalog and then more easily recall the circumstance of the post and/or cataloging of the post. This allows the user to remember particular events or occurrences that may have occurred some time ago.

As can be seen, the communications system is advantageous in that it is tied to physical locations. In this manner, the communications system provides a system that encourages users within a community or other area to post, converse, share information, and meet. This helps foster a cordial community. Though users may choose to remain anonymous on the communications system, the fact that communication is between local users allows the communications system to be more intimate than traditional social networking, where one's friends may be (and typically are) geographically remote.

It will be understood that elements of the various embodiments disclosed may be combined in various ways. In addition, the above description focuses on particular aspects of the communications system. Well known features have not been detailed to focus on these aspects of the communications system.

What is claimed is:

1. A geographically limited communications system comprising:
one or more communication devices configured to receive from one or more portable devices:
a new post comprising text, location information, and a user identifier identifying a first user;
one or more storage devices configured to store the new post;
a plurality of preexisting posts stored on the one or more storage devices, each of the plurality of preexisting posts comprising text, location information, and a user identifier identifying a second user;
one or more processors configured to:
identify a subset of the plurality of preexisting posts that geographically overlap the new post, wherein a preexisting post is determined to geographically overlap the new post by comparing location information of the new post to location information of the preexisting post and determining if the new post is within a predefined proximity around the preexisting post based on such comparison; and
for each preexisting post in the subset, send via the one or more communication devices a notification to an electronic device carried by the second user identified by the user identifier of;
wherein the electronic device being carried by the second user and the second user are at a current location that is remote from and outside the predefined proximity of each preexisting post in the subset when the notification is sent to alert the second user to new posting activity at one or more previous locations where the second user was previously located that are all geographically remote from the current location of the second user.

2. The communications system of claim 1, wherein the one or more storage devices are configured to store a category identifier for one or more of the plurality of preexisting posts and the new post.

3. The communications system of claim 1, wherein the one or more communications devices send the notification only when the category identifiers of the new post and each of the preexisting posts in the subset are the same.

4. A geographically limited communications system comprising:
one or more communication devices configured to receive,
a plurality of posts from one or more portable devices, each of the plurality of posts comprising text, location information, and a user identifier, the location information identifying a particular geographic location and a predefined area surrounding the particular geographic location;
one or more storage devices configured to store the plurality of posts; and
one or more processors configured to:
identify a subset of the plurality of posts that geographically overlap a new post received via the one or more communication devices, wherein each of the plurality of posts is deemed to geographically overlap the new post by comparing location information of the new post to location information of each of the plurality of posts and determining if the new post is within the predefined area of each of the plurality of posts based on such comparison; and generate a notification to one or more users indicating that a new overlapping post has been received by the communications system, the one or more users being only those identified by the user identifier in the one or more of the plurality of posts in the subset, wherein the one or more users do not include the user that made the new post and are remote from and outside the predefined area of each of the one or more of the plurality of posts in the subset when the notification is sent to alert the one or more users to new posting activity at one or more previous locations where the one or more users were previously located that are all geographically remote from the current location of the one or more users.

5. The communications system of claim 4, wherein the one or more communication devices are configured to receive one or more requests comprising the current location of the one or more users.

6. The communications system of claim 5, wherein the one or more processors are configured to retrieve one or more of the plurality of posts that are at the user's current location using the location information of the plurality of posts, whereby the one or more of the plurality of posts that are retrieved are transmitted to a user at the user's current location via the one or more communication devices.

7. A method of communicating in a geographically limited manner comprising:

providing a server configured to receive a plurality of posts comprising location information and a user identifier, wherein the location information identifies a particular geographic location and a predefined area surrounding the particular geographic location;

receiving a user's current location from a portable device of the user;

transmitting to the user's portable device only one or more of the plurality of posts that are located at the user's current location to allow the user to only view the one or more of the plurality of posts that are at the user's current location;

receiving a new post from the portable device of the user, the new post comprising location information identifying a particular geographic location;

identifying a subset of the plurality of posts having predefined areas that geographically overlap the particular geographic location of the new post;

sending a notification only to one or more users identified in the one or more of the plurality of posts in the subset, wherein the user making the new post is not notified and the one or more users that are notified are remote from and outside the predefined area of each of the plurality of posts in the subset when the notification is sent to alert the one or more users to new posting activity at one or more previous locations where the one or more users were previously located that are all geographically remote from the current location of the one or more users; and transmitting the one or more posts having overlapping predefined areas to the one or more users to allow the one or more users to view the one or more posts having overlapping predefined areas.

8. The method of claim 7 further comprising receiving a category identifier for one or more of the plurality of posts, and storing the category identifier along with the user identifier to catalog the one or more of the plurality of posts.

9. The method of claim 7, wherein the notification to the one or more users is also sent when one or more of the plurality of posts are within a predefined geographic area, the one or more users being identified by the user identifier in one or more of the plurality of posts located within the predefined geographic area.

* * * * *